US009350822B2

(12) United States Patent
Li et al.

(10) Patent No.: US 9,350,822 B2
(45) Date of Patent: *May 24, 2016

(54) DISTRIBUTED WEB OBJECT IDENTIFICATION FOR WEB CACHING

(75) Inventors: Dan Li, Sunnyvale, CA (US); Mahesh Viveganandhan, Cupertino, CA (US); Dipak Punnoran Koroth, Fremont, CA (US); Ming Tan, San Jose, CA (US); Martin Ostrowski, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 567 days.

This patent is subject to a terminal disclaimer.

(21) Appl. No.: 13/571,786

(22) Filed: Aug. 10, 2012

(65) Prior Publication Data
US 2014/0044127 A1  Feb. 13, 2014

(51) Int. Cl.
 *H04L 12/28* (2006.01)
 *H04L 29/08* (2006.01)
(52) U.S. Cl.
 CPC ............................... *H04L 67/2852* (2013.01)
(58) Field of Classification Search
 CPC ................................................ H04L 67/2852
 USPC ......................................................... 370/389
 See application file for complete search history.

(56) References Cited

U.S. PATENT DOCUMENTS

| 6,317,778 | B1 * | 11/2001 | Dias et al. .................... 709/214 |
| 6,434,608 | B1 * | 8/2002 | Desai ............................. 709/217 |
| 8,255,557 | B2 * | 8/2012 | Raciborski et al. ........... 709/231 |
| 8,275,829 | B2 * | 9/2012 | Plamondon .................... 709/203 |
| 8,880,636 | B2 * | 11/2014 | Westberg et al. ............. 709/213 |
| 8,909,808 | B2 * | 12/2014 | Li ........................... H04L 67/02 709/223 |
| 2002/0103928 | A1 * | 8/2002 | Singal et al. .................. 709/238 |
| 2002/0198953 | A1 * | 12/2002 | O'Rourke et al. ............ 709/213 |
| 2003/0018796 | A1 * | 1/2003 | Chou et al. .................... 709/231 |
| 2003/0026254 | A1 * | 2/2003 | Sim ................................ 370/392 |
| 2003/0187917 | A1 * | 10/2003 | Cohen ........................... 709/203 |
| 2003/0188106 | A1 * | 10/2003 | Cohen ........................... 711/133 |
| 2005/0060497 | A1 * | 3/2005 | Krissell et al. ................ 711/133 |
| 2010/0191805 | A1 * | 7/2010 | Lu et al. ........................ 709/203 |
| 2012/0005366 | A1 * | 1/2012 | Ma et al. ....................... 709/231 |
| 2013/0047149 | A1 * | 2/2013 | Xu ............................ G06F 8/60 717/175 |

* cited by examiner

*Primary Examiner* — Guang Li
(74) *Attorney, Agent, or Firm* — Merchant & Gould P.C.

(57) ABSTRACT

In some embodiments, a request for a content object may be received as a data packet. Upon determining that the content object is not cached, an element of the data packet may be modified and the modified data packet may be forwarded toward a content provider of the content object.

19 Claims, 4 Drawing Sheets

DISTRIBUTED WEB OBJECT IDENTIFICATION FOR WEB CACHING

BACKGROUND

Today's Internet traffic profiles show a large percentage of OTT (over-the-top) media traffic from media content providers such as video streaming sites. While the content is distributed geographically, either through their own, or third-party CDNs (Content Delivery Networks), it often ends up consuming a lot of bandwidth in customer facing Internet Service Provider (ISP) networks, both internally and at peering points. Such bandwidth consumption greatly increases transit costs as well as impacting the customer experience. Furthermore, OTT traffic is difficult to cache because the ISPs don't have explicit relationships with the OTT content providers. In addition, the OTT content often has special HTTP properties that make it non-cacheable in the traditional sense, such as the inability to uniquely identify cacheable objects through their uniform resource locators (URLs).

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
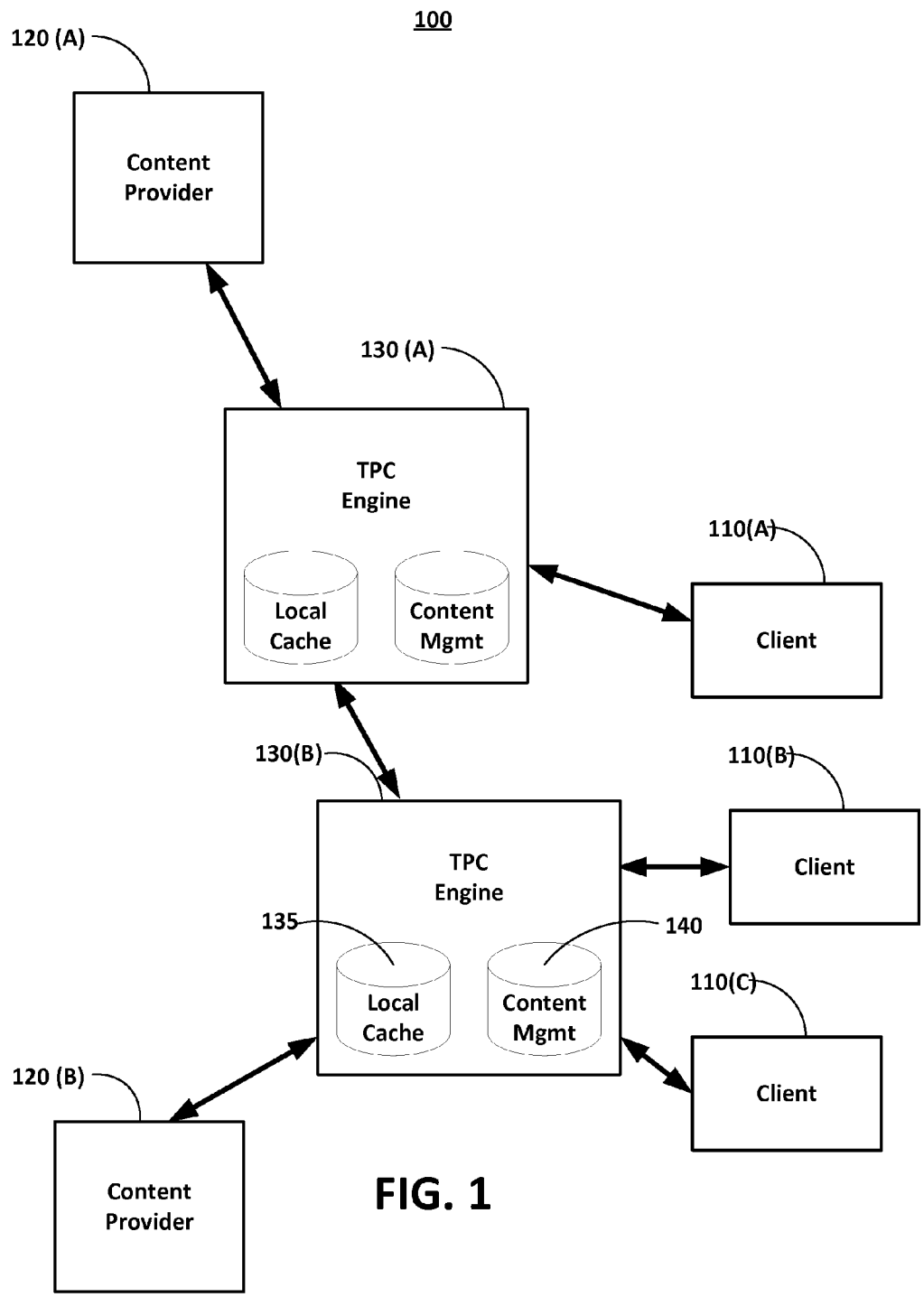
FIG. 1 is a block diagram of an operating environment.

Consistent with embodiments of the present disclosure, systems and methods are disclosed for providing distributed web object identification.

In some embodiments, a request for a content object may be received as a data packet. Upon determining that the content object is not cached, an element of the data packet may be modified and the modified data packet may be forwarded toward a content provider of the content object.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In the fields of broadcasting and content delivery, over-the-top content (OTT) comprises on-line delivery of video and audio without the Internet service provider (e.g., Comcast, Verizon, etc.) being involved in the control or distribution of the content itself. The provider may be aware of the contents of the IP packets, but may be neither responsible for nor in control of the viewing abilities, copyrights, and/or other redistribution of the content. This is in contrast to delivery through purchase or rental of video or audio content from the Internet provider, such as pay-per-view/video on demand. OTT in particular refers to content that arrives from a third party (e.g., Netflix, Hulu, etc.) and arrives to the end user device, leaving the Internet provider responsible only for transporting IP packets. Consumers may access OTT content through Internet-connected devices such as PCs, laptops, tablets, set top boxes and gaming consoles such as the PlayStation 3 and Xbox 360.

For such OTT content, the Uniform Resource Locator (URL) may no longer comprise a unique identifier of the content; multiple URLs can point to the same content object. This breaks traditional web caching and results in very low cache-hit ratio. Herein, a redundancy elimination may be provided to uniquely identify a web object, based on its actual content and metadata.

Whenever a web object passes through a transparent proxy caching (TPC) engine, a fingerprint (e.g., an md5 hash) may be calculated over the content payload of an HTTP response and/or selected HTTP headers. The fingerprint may be generated from the entire payload, or some portions of it. This fingerprint is unique to this web object and is much smaller than the object itself. The TPC Engine may save the fingerprint in a content manager database, along with the object's URL and/or HTTP headers, as part of the object's metadata record. The TPC Engine may also makes a "cacheability" determination based on the HTTP headers of the object and the HTTP/1.1 standards definition and this determination may also be stored in the metadata record.

As content objects traverse a network, a count of how many times a particular fingerprint is seen may be stored. Once an object's fingerprint exceeds a popularity threshold, the content object may be cached. In a large deployment, numerous TPC engines may be positioned both at the edges of the network and closer to the core. This mesh of TPC Engines may be used to further accelerate OTT content delivery by passing "fingerprints" between TPC engines in the mesh; no pairing relationship may be required between such engines.

Upon receiving a content request, and edge TPC engine may check if the content is already cached. If not, a "cache-miss" case may result, wherein the edge TPC engine issues an HTTP request toward the content provider after including the HTTP Accept-Encoding header in the request to denote that it accepts a "fingerprint". Whichever upstream TPC engine received this HTTP request may look up the URL in its local content management database and local cache. If the upstream TPC engine also finds this a cache-miss, it may fetch the object from the Origin Server, and relay the full content back to the edge TPC Engine, identical to the typical "cache-bypass" and "cache-fill" cases.

If, however, the upstream TPC engine finds this a cache-hit, it may send back the fingerprint of the object in the accept-encoding header. When the edge TPC engine receives a fingerprint from the upstream TPC Engine, it may look up this fingerprint in its content management database and its local cache storage. If there is a fingerprint match, the edge TPC Engine may returns the full content to the requestor from its local cache.

If there is no fingerprint match, the edge TPC engine may issue the request again to the upstream TPC Engine, now without the Accept-Encoding header. The upstream TPC engine may no longer send the fingerprint, but may send the full content from its local cache and/or the content provider.

FIG. 1 is a block diagram view of an operating environment 100 for providing distributed object identification. Operating environment 100 may comprise a plurality of clients 110(A)-(C) in communication with a plurality of content providers 120(A)-(B) and a plurality of TPC engines 130 (A)-(B). Each of plurality of TPC engines 130(A)-(B) may comprise a local cache 135 and a content management database 140. Clients 110(A)-(C) may comprise content consuming devices such as computers, cable set-top boxes, mobile devices, laptops, cellular phones, tablets, etc. Clients 110(A)-(C), content providers 120(A)-(B), and TPC engines 130(A)-(B) may be in communication via a network such as the Internet, a wired network, a wireless network, a cellular network, and/or a service provider (i.e., cable television and/or satellite) network.

HTTP sessions may be established from one of plurality of clients 110(A)-(C) to an edge TPC engine, then to one (and/or more) upstream TPC engine(s), and finally to a content provider. For example, Client 110(C) may request a video stream from content provider 120(A). The request may first travel to edge TPC engine 130(B), then through upstream TPC engine 130(A), and finally to content provider 120(A). The delivered content may then traverse the reverse path.

Figure 2:
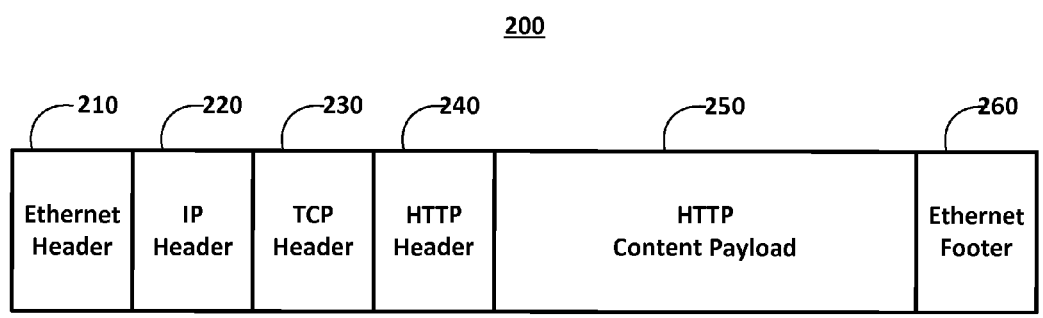
FIG. 2 is a block diagram of a data packet.

FIG. 2 is a block diagram of a data packet 200. Data packet 200 may comprise a plurality of segments such as an Ethernet header 210, an Internet Protocol (IP) header 220, a Transmission Control Protocol header 230, a Hypertext Transport Protocol (HTTP) header 240, a Hypertext Transport Protocol (HTTP) content payload 250, and an Ethernet footer 260. The header segments of data packet 200 may comprise information regarding sender and destination addresses and ports, sizes, versions, packet length, checksums, sequence numbers, flags, etc. For example, IP header 220 may comprise a TTL value representing a number of hops the packet may traverse before being dropped. HTTP header 250 may comprise information about the content of HTTP content payload 250, such as cache-control instructions, in accordance with the RFC 2616 standard for HTTP/1.1. Data packet 200 may be transmitted among the various elements depicted in operating environment 100 via network 115.

Figure 3:
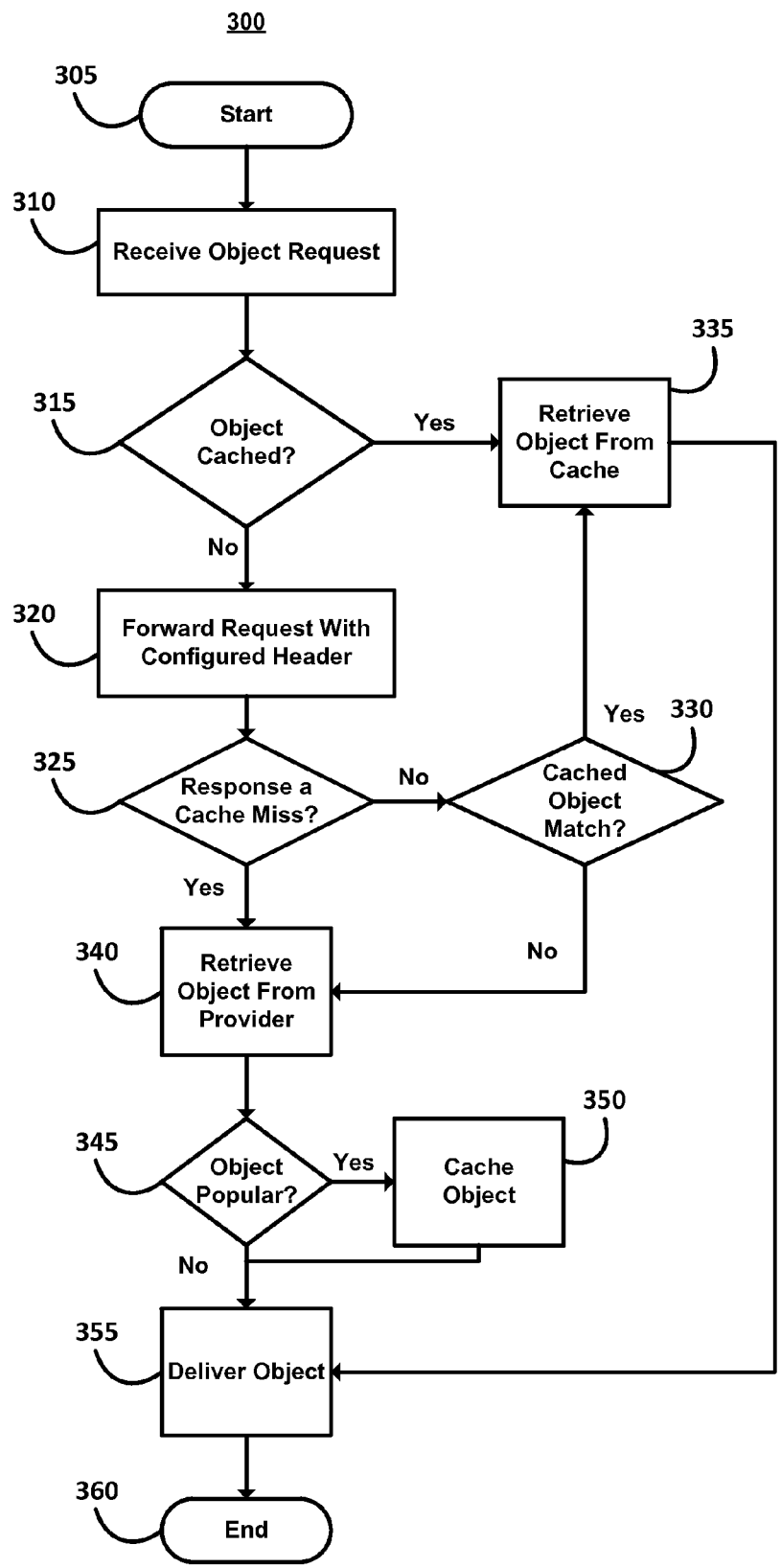
FIG. 3 is a flow chart illustrating a method for providing distributed object identification.

FIG. 3 illustrates a flow chart setting forth the general stages involved in a method 300 consistent with an embodiment of the disclosure for providing distributed object identification. Method 300 may be implemented using the components illustrated in operating environment 100 as described above. Ways to implement the stages of method 300 will be described in greater detail below. Method 300 may begin at starting block 305 and proceed to stage 310 where computing device 400 may receive a request for a content object as a data packet. For example, TPC engine 130(B) may receive a request from client 110(C) for a content object, such as a video file, provided by content provider 120(A).

Method 300 may then advance to stage 315 where computing device 400 may determine whether the requested content object is cached. For example, TPC engine 130(B) may determine whether any objects stored in local cache 135 are associated with the same identifier as the requested content object. Such an identifier may comprise, for example, a uniform resource locator (URL).

If the object is determined not to be cached at stage 315, method 300 may advance to stage 320 where computing device 400 may forward the request toward the content provider. For example, TPC engine 120(B) may modify the request packet to add a header, such as an accept-encoding header in a hypertext transport protocol (HTTP) packet, before forwarding the request toward content provider 120(A) via TPC engine 130(A).

From stage 320, method 300 may then advance to stage 325 where computing device 400 may determine whether the forwarded packet resulted in a cache miss. For example, a response to the request packet may be received from TPC engine 120(A) comprising the forwarded request rather than the requested content object. The response packet may comprise a fingerprint associated with the requested object stored as the value in the accept-encoding header, or the accept-encoding header may still comprise a null value. A null value indicates a cache miss, in that the upstream TPC engine 120(A) also did not have a cached copy of the requested object. A fingerprint returned as the value indicates a cache hit, wherein the fingerprint may comprise a hash value associated with the requested object that is not solely reliant on the URL as an identifier.

If the response indicates a cache hit, method 300 may advance to stage 330 where computing device 400 may determine whether any objects stored in a local cache match the fingerprint. For example, TPC engine 130(B) may consult content management database 140 to see if the returned fingerprint matches any content object fingerprints previously cached in local cache 135.

If the fingerprint matches a cached object at stage 330, or if the object was determined to be cached at stage 315, method 300 may advance to stage 335 where computing device 400 may retrieve the identified object from the cache.

If the response indicated a cache miss at stage 325, or if no content objects matched the fingerprint at stage 330, method 300 may advance to stage 340 where computing device 400 may retrieve the requested content object from the provider. For example, TPC engine 120(B) may re-forward the content request toward the content provider, this time without the added header. Upstream TPC engines may then relay the packet to the content provider and return the requested content object to the requesting client. Consistent with embodiments of this disclosure, if an upstream TPC engine returns a fingerprint associated with the content object, then receives the request for the object from a TPC engine that did not have the object cached, that upstream TPC engine may respond with its cached copy of the content object rather than forwarding the request all the way to the content provider.

Method 300 may then advance to stage 345 where computing device 400 may determine whether the retrieved content object exceeds a popularity threshold. For example, if the content object has been requested more than ten times within a minute period, the content object may be deemed popular enough to be cached. Such thresholds may be configurable with respect to number of times requested and/or with respect to a time frame within which the object requests have been seen. For another example, if the content object is cached at an upstream TPC engine, as indicated by a cache hit, a downstream TPC engine may determine that the content object is sufficiently popular to be cached.

If the object exceeds the content threshold Method 300 may then advance to stage 315 where computing device 400 may cache the content object. For example, as the content object is received from an upstream TPC engine 130(A) and/or content provider 120(A), TPC engine 120(B) may store a copy of the content object in local cache 135 in accordance with any copy restrictions associated with the content object.

After retrieving the object from a cache in stage 335, determining that the content object is not popular enough to be cached in stage 345, or after caching the object in stage 350, method 300 may advance to stage 355 where computing device 400 may deliver the content object to the requestor. For example, TPC engine 130(B) may transmit the requested content object to client 110(C). Method 300 may then end at stage 360.

Figure 4:
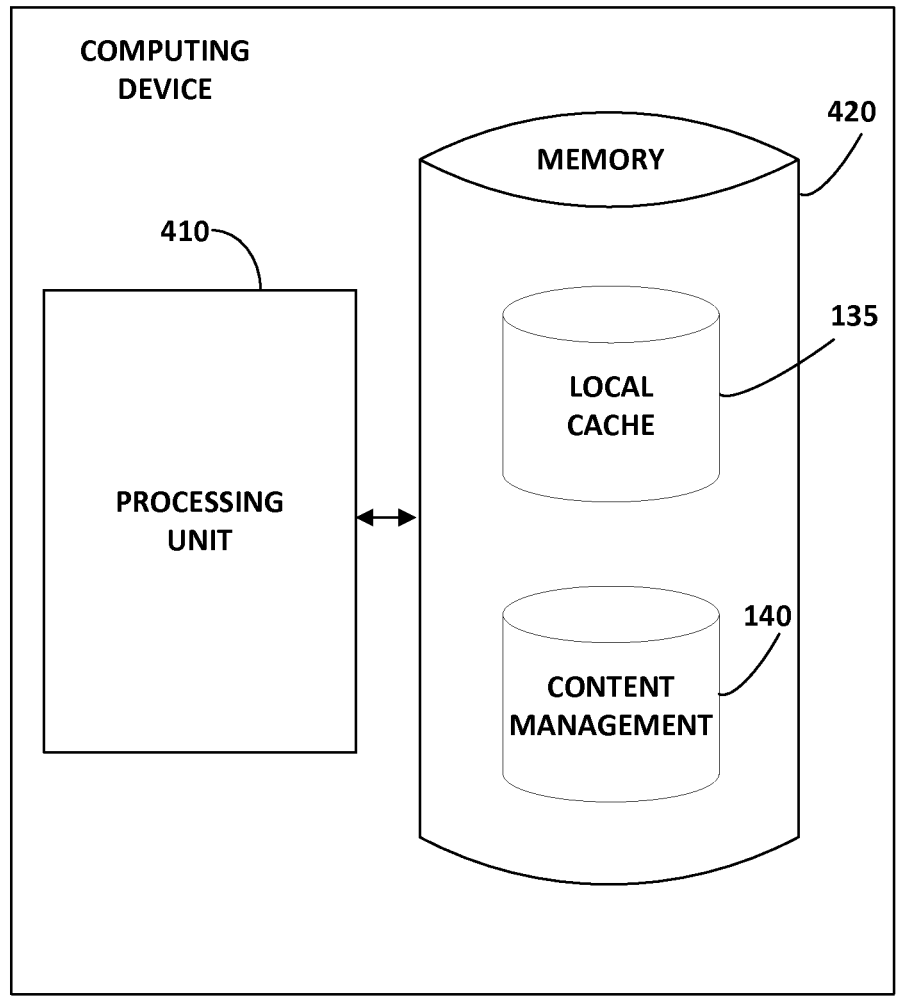
FIG. 4 is a block diagram illustrating components of a computing device.

FIG. 4 illustrates computing device 400 comprising a processing unit 410 and a memory unit 420. Memory 420 may include local cache 135 and content management database 140. While executing on processing unit 410, these and other software modules and/or data sources may perform processes for providing redundancy elimination in web caching, for example, via one or more stages included in method 300 described above with respect to FIG. 3. Moreover, any one or more of the stages included in method 300 may be performed on any element shown in operating environment 100 and each of the elements illustrated in operating environment 100 may comprise a similar computing device to that illustrated by FIG. 4.

Computing device 400 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
  receiving a request for a content object at a first proxy caching (PC) engine, the request comprising a request packet;
  determining whether the content object is cached at the first PC engine; and
  in response to determining that the content object is not cached at the first PC engine:
    modifying an element of the request packet, wherein modifying the element of the request packet comprises add an accept-encoding header in the request packet, the accept-encoding header providing an indication to an upstream PC engine that the first PC engine accepts a fingerprint associated with the content object,
    forwarding the modified request packet toward a second PC engine, and
    receiving a response to the forwarded request packet from the second PC engine, the response comprising the forwarded request packet with a second modification in the accept-encoding header.

2. The method of claim 1, wherein modifying the element comprises modifying a header of the request packet.

3. The method of claim 2, wherein modifying the header of the request packet further comprises adding the accept-encoding header to the header of the request packet.

4. The method of claim 1, wherein initiating the accept-encoding header comprises initiating the accept-encoding header having a null value.

5. The method of claim 1, wherein the second modification comprises a non-null value in the header.

6. The method of claim 1, wherein the second modification comprises the fingerprint associated with the content object.

7. The method of claim 6, further comprising:
  determining whether the fingerprint is associated with a cached object; and
  in response to determining that the fingerprint is associated with the cached object, responding to the request for the content object with the cached object.

8. The method of claim 1, further comprising:
  receiving a response to the forwarded request packet, wherein the response comprises a copy of the requested content object; and
  responding to the request for the content object with the copy of the requested content object.

9. An apparatus comprising:
  a memory storage; and
  a processor coupled to the memory storage, the processor operative to:
  receive a request for a content object at a first proxy caching (PC) engine, the request comprising a request packet;
  determine whether the content object is associated with a cached object in the memory storage,
  in response to determining that the content object is not associated with the cached object in the memory storage:
  modify the request packet to add an accept-encoding header to the request packet, the accept-encoding header providing an indication to an upstream PC engine that the first PC engine accepts a fingerprint associated with the content object;
  forward the modified request packet to a second PC engine, and receive a response to the forwarded request packet from the second PC engine, the response comprising the forwarded request packet with a second modification in the accept-encoding header.

10. The apparatus of claim 9, wherein the processor being further operative to forward the request packet toward a content provider associated with the content object.

11. The apparatus of claim 9, wherein the processor is further operative to:
receive another response to the forwarded request packet, wherein the another response comprises a copy of the requested content object; and
respond to the request with the copy of the requested content object.

12. The apparatus of claim 9, wherein
the response further comprises a copy of the forwarded request comprising the fingerprint value associated with the modified header of the request.

13. The apparatus of claim 12, wherein the processor is further operative to:
determine whether the fingerprint is associated with a cached copy of the requested content object; and
in response to determining that the fingerprint is associated with the cached copy of the requested content object, respond to the request with the cached copy of the content object.

14. The apparatus of claim 12, wherein the processor is further operative to:
determine whether the fingerprint is associated with a cached copy of the requested content object; and
in response to determining that the fingerprint is not associated with the cached copy of the requested content object:
remove the accept-encoding header from the request packet; and
re-forward the request toward a content provider associated with the content object.

15. A non-transitory computer-readable media comprising a software executed to:
receive a request packet comprising a request for a content object at a first proxy caching (PC) engine;
determine whether a cached copy associated with the requested content object exists in a content manager database; and
in response to determining that the cached copy of the content object does not exist in the content manager database:
modify the request packet to add an accept-encoding header to the request packet, the accept-encoding header providing an indication to an upstream PC engine that the first PC engine accepts a fingerprint associated with the content object,
forward the modified request packet toward a content provider associated with the requested content object, and
receive a response to the forwarded request packet from a second PC engine, the response comprising the forwarded request packet with a second modification in the accept-encoding header.

16. The software of claim 15, further executed to:
determine whether the response comprises the fingerprint value associated with the accept-encoding header; and
in response to determining that the response comprises the fingerprint value associated with the accept-encoding header:
determine whether the fingerprint is associated the requested content object, and
in response to determining that the fingerprint is not associated with the requested content object:
remove the accept-encoding header from the request; and
re-forward the request toward the content provider associated with the requested content-object.

17. The software of claim 16, further executed to:
in response to determining that the fingerprint is associated with the requested content object, retrieve the requested content object from the second PC engine.

18. The software of claim 16, further executed to:
receive the requested content object from the content provider,
calculate a popularity for the requested content object,
determine whether the popularity of the requested content object exceeds a threshold value, and
in response to determining that the popularity of the requested content object exceeds a threshold value, cache a copy of the requested content object received from the content provider.

19. The software of claim 18, further executed to:
receive a second data packet comprising a second request for the requested content object comprising a second accept-encoding header;
calculate a fingerprint for the cached copy of the requested content object;
modify a value of the second accept-encoding header to the calculated fingerprint; and
respond to the second request with the second data packet comprising the modified second accept-encoding header.

* * * * *